United States Patent [19]
Choi

[11] Patent Number: 5,936,744
[45] Date of Patent: Aug. 10, 1999

[54] METHOD AND APPARATUS FOR RECEIVING FACSIMILE IMAGE DATA DEPENDING ON A REGISTRATION IN A RECEIVING FACSIMILE APPARATUS OF A SENDER'S TELEPHONE NUMBER

[75] Inventor: Hai-Yeal Choi, Gumi, Rep. of Korea

[73] Assignee: SamSung Electronics Co., Ltd., Suwon, Rep. of Korea

[21] Appl. No.: 08/781,586

[22] Filed: Jan. 9, 1997

[30] Foreign Application Priority Data

Jan. 9, 1996 [KR] Rep. of Korea .......................... 96-283

[51] Int. Cl.$^6$ ...................................................... H04N 1/40
[52] U.S. Cl. ........................ 358/440; 358/400; 358/404; 358/405
[58] Field of Search ..................... 358/440, 434, 358/435, 436, 437, 438, 439, 441, 400, 404, 405

[56] References Cited

U.S. PATENT DOCUMENTS

| | | | |
|---|---|---|---|
| 5,155,601 | 10/1992 | Toyama | 358/400 |
| 5,165,096 | 11/1992 | Matsumoto . | |
| 5,239,576 | 8/1993 | Yoshida et al. | 379/354 |
| 5,293,253 | 3/1994 | Kida et al. | 358/439 |
| 5,307,178 | 4/1994 | Yoneda | 358/400 |
| 5,307,179 | 4/1994 | Yoshida | 358/407 |
| 5,317,629 | 5/1994 | Watanable | 379/102 |
| 5,337,350 | 8/1994 | Kuwahara | 379/100 |
| 5,384,836 | 1/1995 | Otsuka | 379/100.14 |
| 5,459,482 | 10/1995 | Orlen | 358/440 |
| 5,510,907 | 4/1996 | Koichi | 358/434 |
| 5,557,425 | 9/1996 | Hasegawa | 358/440 |
| 5,585,938 | 12/1996 | Imamura | 358/434 |
| 5,663,808 | 9/1997 | Park | 358/440 |

FOREIGN PATENT DOCUMENTS

| | | |
|---|---|---|
| 430 217 | 6/1991 | European Pat. Off. . |
| 454 387 | 10/1991 | European Pat. Off. . |
| 475 667 | 12/1992 | European Pat. Off. . |
| WO 94/23526 | 11/1992 | WIPO . |

OTHER PUBLICATIONS

WPI Abstract Accession No. 96–122561 & JP 008018759A (Canon) Jan. 19, 1996 (one page).

*Primary Examiner*—Christopher S. Kelley
*Assistant Examiner*—Sheela Chawan
*Attorney, Agent, or Firm*—Robert E. Bushnell, Esq.

[57] ABSTRACT

For selectively receiving a facsimile image data, a sender's facsimile telephone number is registered in the register of a receiver's facsimile machine. Such a method can include the steps of receiving the sender's facsimile telephone number during the communication protocol exchange upon ringing of an incoming signal, detecting whether the sender's facsimile telephone number is registered in the receiver's register, and disconnecting the receiving line to stop the facsimile reception if the sender's facsimile telephone number is not registered in the receiver's register.

17 Claims, 5 Drawing Sheets

| Digit | MSB (Fill bit) | Bits | LSB |
|---|---|---|---|
| + (2B) | 0 | 010100 | 0 |
| 0 (30) | 0 | 011000 | 0 |
| 1 (31) | 0 | 011000 | 1 |
| 2 (32) | 0 | 011001 | 0 |
| 3 (33) | 0 | 011001 | 1 |
| 4 (34) | 0 | 011010 | 0 |
| 5 (35) | 0 | 011010 | 1 |
| 6 (36) | 0 | 011011 | 0 |
| 7 (37) | 0 | 011011 | 1 |
| 8 (38) | 0 | 011100 | 0 |
| 9 (39) | 0 | 011100 | 1 |
| Space (20) | 0 | 010000 | 0 |

Fig. 5

METHOD AND APPARATUS FOR RECEIVING FACSIMILE IMAGE DATA DEPENDING ON A REGISTRATION IN A RECEIVING FACSIMILE APPARATUS OF A SENDER'S TELEPHONE NUMBER

This application makes reference to, incorporates the same herein, and claims all benefits accruing under 35 U.S.C. §119 from an application entitled *Method for Selectively Receiving Facsimile Image Data Depending on the Presence of a Registration of a Sender's Telephone Number* earlier filed in the Korean Industrial Property Office on Jan. 9, 1996, and there duly assigned Ser. No. 283/1996 by that Office.

BACKGROUND OF THE INVENTION

1. Field of the Invention

The present invention relates generally to a method and apparatus for selectively receiving facsimile image data, and more particularly, the present invention relates to a method and apparatus for selectively receiving facsimile image data in dependence upon the presence of the registration of the sender's telephone number.

2. Description of the Related Art

The art of facsimile machines deals with communication and with printing. For instance among exemplars of the contemporary practice, Hasegawa (U.S. Pat. No. 5,557,425, *Facsimile Device For Use in ISDN And Method Of Controlling Same*, Sep. 17, 1996) discusses a facsimile apparatus in which a waste of recording paper due to unnecessary image data such as mischief data and direct mail data, and so forth can be avoided. Hasegawa does not use the particular protocols in such a fashion as in the present invention. Koichi (U.S. Pat. No. 5,510,907, *Facsimile Apparatus Having Urgency Message Transmission Function*, Apr. 23, 1996) discusses a facsimile apparatus having a function to transmit a selected one of urgency messages to a selected one of destination stations, the urgency message transmitted and the destination station being selected by an operator at the start of an urgency message transmit procedure. Orlen (U.S. Pat. No. 5,459,482, *Facsimile Communication With An Active Addressing Display Device*, Oct. 17, 1995) discusses a method and apparatus for facsimile communication having an active addressing display comprising picture elements controlled by a plurality of first and second electrodes. Otsuka (U.S. Pat. No. 5,384,836, *Facsimile Apparatus Automatically Registrable Of Identification Name*, Jan. 24, 1995) discusses a facsimile apparatus having a compacted-dial function, that can automatically store facsimile numbers (or telephone numbers), and so forth, input by the operator. Yoshida (U.S. Pat. No. 5,307,179, *Facsimile Apparatus And Method Of Communication*, Apr. 26, 1994) discusses a facsimile apparatus and a method of communication having a plurality of communication modes, in which reception from parties other than specific parties can be refused. Yoneda (U.S. Pat. No. 5,307,178, *Facsimile Terminal Equipment*, Apr. 26, 1994) discusses a facsimile terminal equipment which can reject unnecessary communication, but does not remove the ability to receive facsimile communication from any subscriber. Kida et al. (U.S. Pat. No. 5,293,253, *Facsimile Apparatus For Receiving Facsimile Transmission Selectively*, Mar. 8, 1994) discusses a facsimile apparatus for receiving facsimile transmission selectively upon discrimination of a calling station. From my study of these exemplars of the contemporary practice and of the prior art, I find that there is a need for an effective and improved method and apparatus for selectively receiving facsimile image data which uses the particular protocols in such a fashion as in the present invention.

SUMMARY OF THE INVENTION

Accordingly, an object of the present invention is to provide an improved method and apparatus for selectively receiving facsimile image data.

It is another object to provide method and apparatus for selectively receiving facsimile image data depending on the presence of the registration of the sender's telephone number.

It is a further object to provide a method for selectively receiving facsimile image data depending on the presence of the registration of the sender's telephone number, wherein the facsimile image data are received only when confirming that the sender's telephone number is registered in the receiver's register during the exchange of facsimile communication protocol between facsimile machines of both sides.

It is still another object to provide a method for selectively receiving facsimile image data depending on the presence of the registration of the senders' telephone numbers, wherein the telephone numbers desired are registered in advance in the register of the receivers' facsimile machines, and the facsimile image data can be sent and received only when the senders' telephone numbers are confirmed by the receivers' register during the exchange of facsimile protocol between facsimile machines of both sides.

It is yet another object to provide a method for selectively receiving the facsimile image data depending on the presence of the senders' telephone numbers registered in the receivers' register of the facsimile machines.

According to the present invention, facsimile image data can be selectively received on a basis of the presence of a sender's facsimile telephone number registered in the register of a receiver's facsimile machine comprises the steps of receiving the sender's facsimile telephone number during the communication protocol exchange upon ringing of an incoming signal, detecting whether the sender's facsimile telephone number is registered in the receiver's register, and disconnecting the receiving line to stop the facsimile reception if the sender's facsimile telephone number is not registered in the receiver's register.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 is a construction table of a facsimile device, built according to the principles of the present invention.

DETAILED DESCRIPTION OF THE PREFERRED EMBODIMENT

Figure 1:
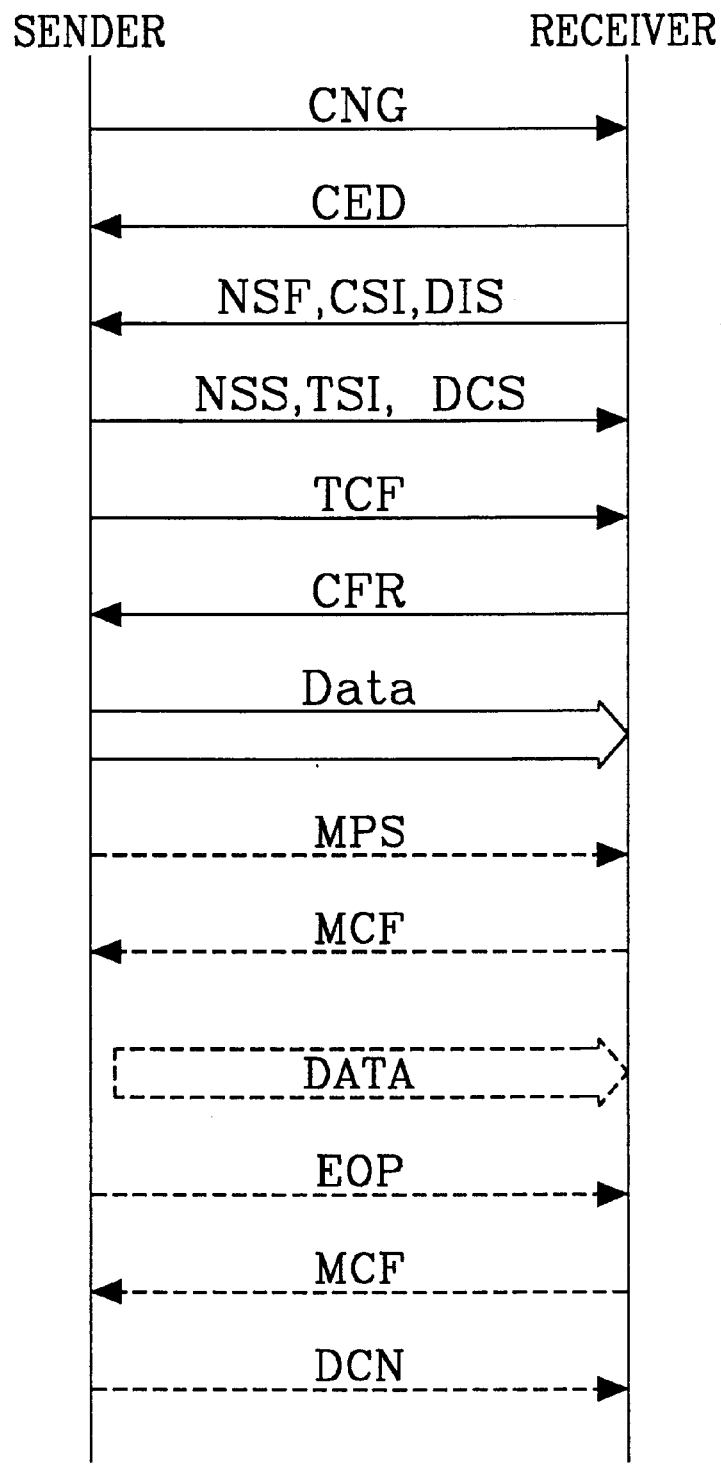
FIG. 1 is a diagram illustrating the protocol for a facsimile transmission device, according to a contemporary practice.

Turning now to the drawings, in a facsimile communication of a contemporary practice, the sender's and receiver's facsimile machines exchange the facsimile protocol as shown in FIG. 1 before sending and receiving the image data when the sender calls the receiver. Such a facsimile protocol can follow a CCITT (Consultative Committee for International Telephone and Telephone, or International Telecommunications Union) T.30 convention. For instance, when the sender's facsimile machine (hereinafter referred to as "sender" calls the receiver's facsimile machine (hereinafter referred to as "receiver", the sender first transfers a CNG (Calling Tone) signal to the receiver. This can be according to Call Establishment, Method 4 of CCITT Rec. T.30, FIG. 5/T.30, page 85, Fascicle VII.3 IXth Plenary Assembly, Melbourne, 1988. Then, the receiver transmits a CED (Called Station Identification) signal when receiving the above CNG signal, thereafter transmitting "initial identification" according to CCITT. Such "initial identification" can be of NSF (Non-Standard Facilities), CSI (Called Subscriber Identification) and DIS (Digital Identification Signal) signals, transmitted successively to the sender. Initial identification is of format of 0000 XXXX. An NSF is an optional signal used to identify specific user requirements which are not covered by the Series T Recommendations of CCITT. An NSF is of format of 0000 0100. A CSI is an optional signal that can be used to provide the specific identity of the called subscriber by its international telephone number. A CSI is of format of 0000 0010. A DIS characterizes the standard CCITT capabilities of the called apparatus. A DIS is of format of 0000 0001.

Sometimes, the sender continues to transmit. Later, the sender transmits "command to receive" signals of CCITT. A series of command to receive signals can be of NSS (Non-Standard Facilities Setup), TSI (Transmitting Subscriber Identification) and DCS (Digital Command Signal) signals, and thereafter TCF (Training check) signal to the receiver. "Command to receive" signals are of format of X100 XXXX. An NSS signal is an optional signal that is the digital command response to the information contained in the NSF (Non-Standard Facilities) signal. An NSS signal is of format of X100 0100. A TSI signal is an optional signal that can be used to indicate that the FIF (facsimile information field, which can follow a TSI signal) information is the identification of the transmitting station. It can be used to provide additional security to the facsimile procedures. A TSI signal is of format of X100 0010. A DCS signal is the digital setup command responding to the standard capabilities identified by the DIS signal. A DCS signal is of format of X100 0001. A TCF signal is the digital command sent through the T.4 modulation signal to verify training and to give a first indication of the acceptability of the channel for the data rate. A TCF signal is of format of a series of 0s (zeros) for each 1.5 sec ±10%.

Then, the receiver transmits "pre-message signals", such as a CFR (Confirmation To Receive) signal to the sender. "Pre-message signals" of CCITT are sent from a receiver station to a transmitter station. A pre-message signal is of format X010 XXXX. A CFR is a digital signal confirming that the entire pre-message procedure has been completed and the message transmissions can commence. A CFR is of format of X000 0001. In responding to the above CFR signal, the sender transfers the image data to the receiver. In these circumstances, "in-message procedure" of CCITT can be followed. In case of Group 3 machines, the in-message procedure formats and specific signals should be consistent with Rec. T.4 of CCITT.

During communication from the transmitter station to the receiver station, "Post-message commands" such as an EOP signal may be used. A post-message commend is of format of X111 XXXX. When the image data for 1 (one) page is transferred to the receiver, the sender transmits a EOP (End of Page) signal or an End of Procedures to the receiver. Both EOP (End of Page) and End of Procedures signal indicate the end of a complete page of facsimile information. An End of Procedure signal further indicates that no additional documents are forthcoming and indicates to proceed to phase E (call release), upon receipt of a confirmation.

Upon receiving an EOP (End of Page) signal, the receiver can transmit a "post-message response" such as an MCF signal. A post-message response signal is of format of X011 XXXX. Sending an MCF (Message Confirmation) signal to the sender in response to the above EOP signal can be part of completing the sending and receiving operation for the 1 page of image data. An MCF signal indicates that a complete message has been satisfactorily received and that additional messages can follow. An MCF signal can be a positive response to an MPS (Multipage signal). An MCF signal is of format X011 0001. Then, in order to send next page, the sender transmits data for the 1 (one) page and subsequently transmits MPS (Multipage signal) signal to the receiver. An MPS signal is a post-message command of format of X111 0010. Then, after receiving MCF signal from the receiver, the sender sends the next page of image data to the receiver. After completing the transmitting of the last page of image data, the sender transfers EOP signal to the receiver and receives MCF signal therefrom, thereby transmitting DCN (Disconnect) signal to the receiver to terminate the image data transmitting operation. A DCN is of format of X101 1111. A DCN is a line control signal; line control signals are of format of X101 XXXX. A DCN is a command indicating initiation of phase E (call release). Unlike an End of Procedures signal, a DCN requires no response. Thus, upon an DCN signal, the image data transmitting operation terminates.

A facsimile machine of the contemporary practice can have disadvantages. One disadvantage is that unnecessary and unwanted advertising materials can be received, thereby wasting facsimile papers and interfering with the normal business operations. Therefore, in order to prevent such business interference, there is no alternative for such a facsimile machine but to leave the telephone receiver off the hook.

Figure 2:
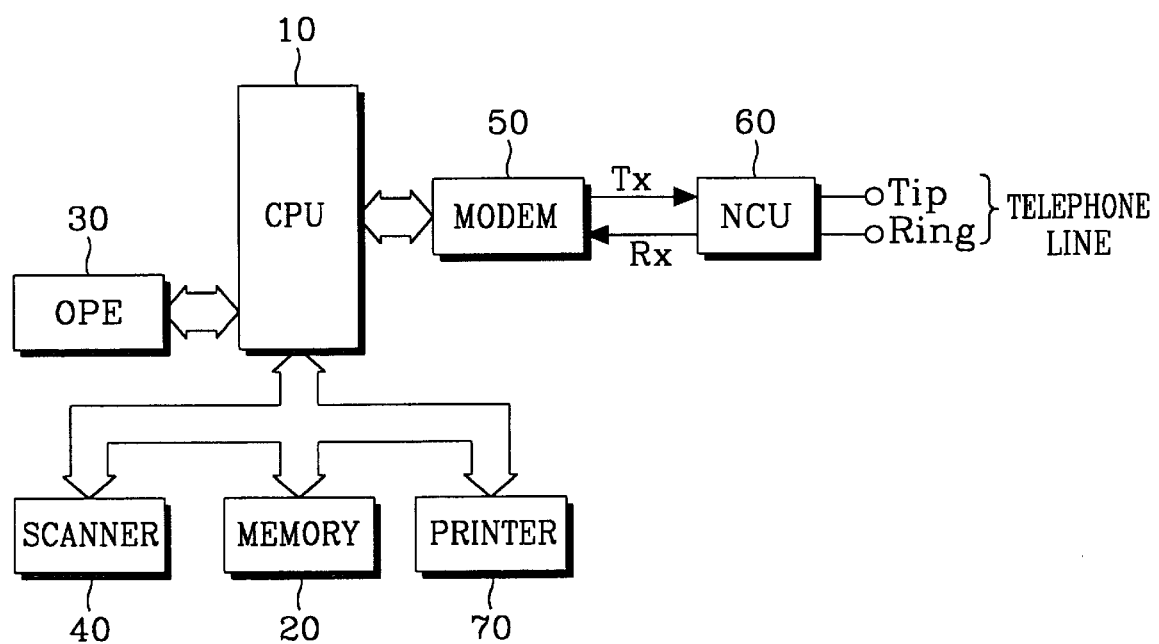
FIG. 2 is a functional block diagram depicting the facsimile transmission system, built according to the principles of the present invention.

Referring now to FIG. 2, there is shown a central processing unit for controlling the system according to a given program, which allows to receive the facsimile image data only when the sender's telephone number is found in the receiver's register by analyzing the sender's telephone number carried on TSI information during the protocol exchange. A memory 20 is to store a program containing protocol and font data. An operation panel (OPE) 30 is provided with a plurality of keys for generating various key data and displaying data. A scanner 40 is to scan and convert the original image into the image data applied to the central processing device 10. A modem 50 is controlled by the above central processing device 10, to modulate the digital data from the central processing unit 10 to analog data for transmission over communication lines and demodulates the analog data received via communication lines to the original digital data to be supplied to the central processing unit 10. A network control unit (NCU) 60 is controlled and operated by the above central processing unit 10, which forms the communicating loop of the telephone line and interfaces between the signal of the modem 50 and the signal of the telephone line. Also, a printer 70 prints out the receiving data according to the control signal from the above central processing unit 10.

Figure 3:
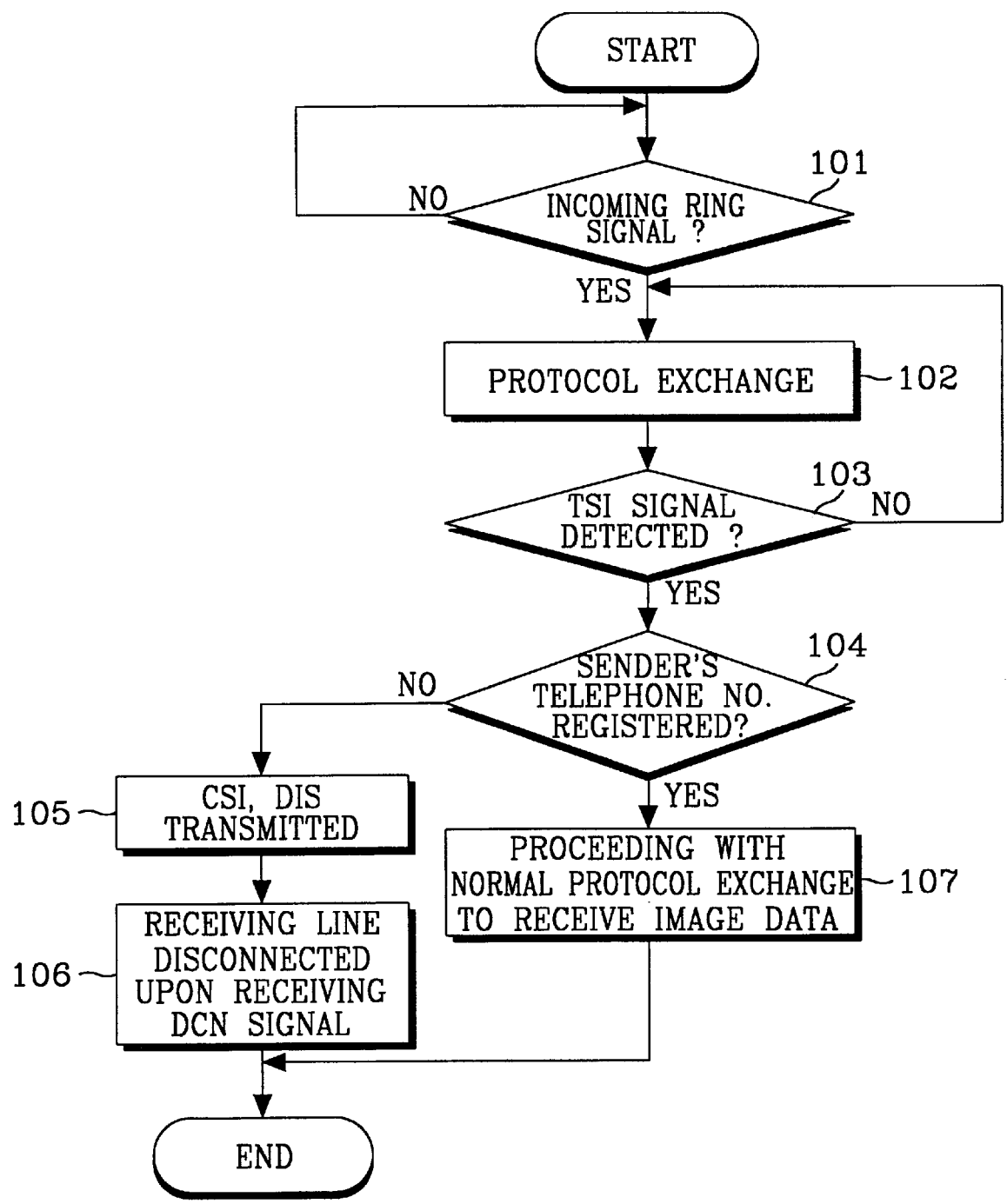
FIG. 3 is a flow chart illustrating a selective reception of the facsimile image data by detecting the presence of the senders' telephone numbers registered in the receivers' register, according to an embodiment of the present invention.

As shown in FIG. 3, a method for the selective reception of the facsimile image data depending on the presence of a senders' telephone number registered in the receiver's register according to an embodiment of the present invention includes the steps of proceeding with the exchange of the communication protocol upon ringing of an incoming signal, analyzing TSI signal detected during the protocol exchange to identify the sender's telephone number registered in the receiver's register, transmitting CSI and DIS signals if the above sender's telephone number isn't registered in the receiver's register, and stopping the facsimile reception by disconnecting the receiving line after receiving DCN signal from the sender.

As shown in FIGS. 2, 3 and 5, when the sender calls the receiver, and if the central processing unit 10 on the receiver side detects the incoming ring signal in Step 101, it proceeds with Step 102, thereby exchanging the protocol as shown in FIG. 1. The sender transmits CNG (Calling Tone) signal to the receiver when calling the receiver. When receiving CNG signal, the receiver transmits CED (Called Station Identification) signal to the sender, thereafter transmitting NSF (Non-standard Facilities), CSI (Called Subscriber Identification), and DIS (Digital Identification Signal) signals successively. The CSI signal carries the sender's information of English alphabets and is transmitted. Then the receiver's central processing unit 10 detects TSI (Transmitting Subscriber Identification) signal, and when detecting TSI signal, proceeds to Step 104. In Step 104, the above central processing unit 10 analyzes TSI signal to detect the sender's telephone number and ascertains whether the detected sender's telephone number is registered in the memory 20. At this time, if the sender's telephone number is not registered in the memory 20, the central processing unit 10 proceeds to Step 105, thereby transmitting CSI and DIS signals and further proceeds to Step 106. Thereafter, the sender transmits DCN signal to the receiver, and in Step 106, after receiving DCN signal from the sender, the receiver's central processing unit 10 disconnects the receiving line and interrupts the facsimile reception of the image data.

By contrast, in Step 104, if the sender's telephone number is registered in the memory 20, the central processing unit 10 proceeds to Step 107 and exchanges the communication protocol normally, thereby receiving the image data. In this instance, after receiving TSI signal and then the TCF signal from the sender, the receiver transmits CFR (Confirmation To Receive) signal to the sender. Thereafter, responding to the above CFR signal, the sender transmits the original image data to the receiver. After sending 1 page of image data, the sender transmits EOP signal to the receiver. When the receiver transmits MCF signal to the sender in response to the above EOP signal, the sending and receiving operation for 1 page of image data is completed, and in order to send next page, the sender transmits data for 1 page and subsequently MPS (Multipage signal) signal to the receiver. After receiving MCF signal from the receiver, the sender sends the next page of image data to the receiver. In the end, when the sender transmits EOP signal for completing the data sending to the receiver and then receives MCF signal from the receiver, the sender transmits DCN signal to the receiver, and the receiver disconnects the communication line to terminate the facsimile reception of image data.

Figure 4:
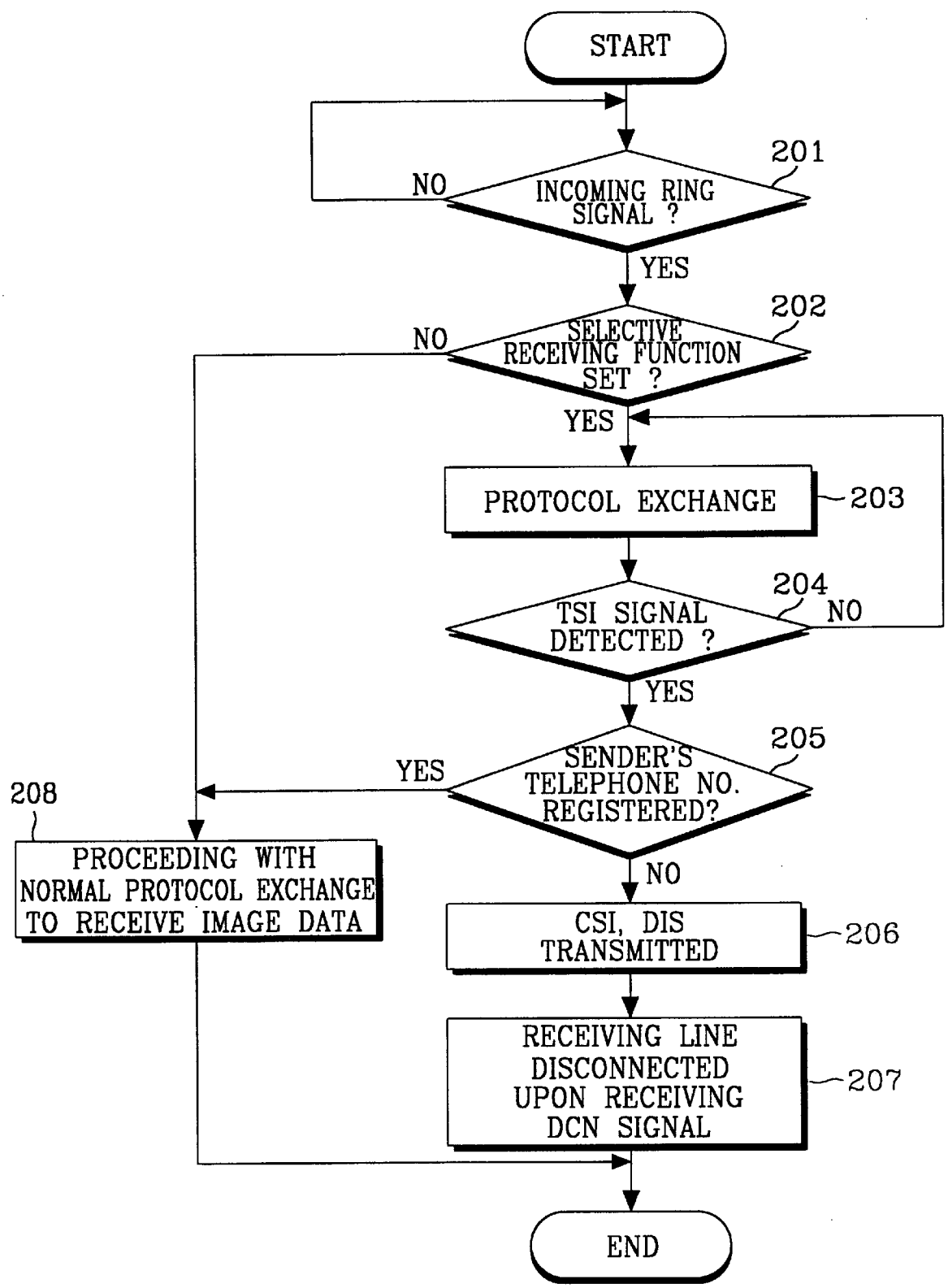
FIG. 4 a flow chart illustrating the selective reception of the facsimile image data by detecting the presence of the senders' telephone numbers registered in the receivers' register, according to another embodiment of the present invention.

FIG. 4 illustrates another embodiment of the present invention. A method for the selective reception of the facsimile image data depending on the presence of the senders' telephone numbers registered in the receiver's register according to another embodiment of the present invention comprises the steps of detecting whether the function of the selective reception is set or not, analyzing TSI signal detected during exchange of the communication protocol when the function of the selective reception is set so as to detect whether the sender's telephone number is registered or not, transmitting CSI and DIS signals if the sender's telephone number isn't registered, disconnecting the communication line to stop the facsimile reception if the sender's telephone number isn't registered, and proceeding with the normal protocol exchange to receive the facsimile image data if the function of the selective reception isn't set.

As shown in FIGS. 2, 4, and 5 (which illustrate a further embodiment of the present invention), when the sender calls the receiver, and if the central processing unit 10 on the receiver side detects the incoming ring signal in Step 201, it proceeds with Step 202. In Step 202, the central processing unit 10 checks whether the function key for the selective reception is entered or not, and if the function of the selective reception isn't set, the central processing unit 10 proceeds to Step 208 to execute the normal protocol exchange, thereby receiving the image data.

By contrast, if the function of the selective reception is set in the above Step 202, the central processing unit 10 proceeds to step 203 to execute the protocol exchange. At this time, when the sender calls the receiver, the sender transmits CNG signal to the receiver. Then the receiver transmits CED signal when receiving the above CNG signal, thereafter transmitting further NSF, CSI and DIS signals successively to the sender. Thereafter in step 204, the receiver's central processing unit 10 checks whether TSI signal exists as shown in FIG. 5, and if TSI signal is detected, it proceeds to step 205. In the above Step 205, the above central processing unit 10 analyzes TSI signal to detect the sender's telephone number and ascertains whether the detected sender's telephone number is registered in the memory 20. At this time, if the sender's telephone number is not registered in the memory 20, the central processing unit 10 proceeds to Step 206, thereby transmitting CSI and DIS signals and further proceeds to Step 207. Thereafter, the sender transmits DCN signal to the receiver, and in Step 207, after receiving DCN signal from the sender, the receiver's central processing unit 10 disconnects the receiving line and interrupts the facsimile reception of the image data.

Alternatively, at Step 205, if the sender's telephone number is registered in the memory 20, the central processing unit 10 proceeds to Step 208 and exchanges the normal communication protocol, thereby receiving the image data. Namely, after receiving TSI signal and then the TCF signal from the sender, the receiver transmits CFR signal to the sender. Thereafter responding to the above CFR signal, the sender transmits the original image data to the receiver. After sending 1 page of image data, the sender transmits EOP signal to the receiver. When the receiver transmits MCF signal to the sender in response to the above EOP signal, the sending and receiving operation for 1 page of image data is completed, and in order to send next page, the sender transmits MPS signal to the receiver, and the receiver transmits MCF signal to the sender. And after receiving MCF signal from the receiver, the sender sends the next page of image data to the receiver. In the end, when the sender transmits EOP signal for completing the data sending to the receiver and then receives MCF signal from the receiver, the sender transmits DCN signal to the receiver, and after receiving DCN signal, the receiver disconnects the communication line to terminate the facsimile reception of image data.

The above TSI signal consists of twenty (20) digit codes. For example, note FIG. 5. In a typical TSI format according to CCITT, the facsimile information field is the international telephone number including the "+" character, telephone country code, area code, and subscriber number. In most of such formats, the least significant bit of the least significant digit is the first bit to be transmitted.

According to at least one of the embodiments of the present invention as aforementioned, because the facsimile image data can be received by the receiver only when the sender's telephone numbers are registered in the receiver's register, the present invention has the advantages to prevent the reception of unnecessary advertising material and image data and the interferences with the normal business operations.

What is claimed is:

1. An apparatus, comprising:

a network control unit connectable to a telephone line;

a modem permitting transmission and reception of information with said network control unit;

a central processing unit connected to said modem;

an operator panel permitting program inputs by a user, said operator panel connected to said central processing unit;

a scanner for converting an image into computer data, said scanner controlled by said central processing unit;

a memory for storing said computer data, said memory controlled by said central processing unit; and a printer controlled by said central processing unit;

said apparatus for selectively receiving facsimile image data by:

said central processing unit detecting a ringing signal received through said network control unit;

upon detecting the ringing signal said central processing unit detecting whether an incoming transmission for said facsimile image data exists;

upon detecting that an incoming transmission for said facsimile image data does not exist, said central processing unit waiting for the ringing signal;

upon detecting that the incoming transmission exists, receiving the incoming transmission for said facsimile image data and while receiving the incoming transmission, said central processing unit conducting a communication protocol exchange;

while conducting the communication protocol exchange, receiving a facsimile telephone number of a sender of the incoming transmission for said facsimile image data;

said central processing unit determining whether a transmitting subscriber identification signal has been detected, said transmitting subscriber identification signal indicating that a facsimile information field signal following the transmitting subscriber identification signal identifies the sender of the incoming transmission, said transmitting subscriber identification signal providing security to the incoming transmission by having a customized coding format;

detecting whether the facsimile telephone number of the sender of the incoming transmission is registered in a register of said memory of facsimile telephone numbers;

upon detecting that the facsimile telephone number of the sender of the incoming transmission is registered in the register of said memory of the facsimile telephone numbers, receiving said facsimile image data;

upon detecting that the facsimile telephone number of the sender of the incoming transmission is not registered in the register of said memory of the facsimile telephone numbers, transmitting a called subscriber identification signal identifying said apparatus by using an international telephone number of a station of said apparatus, and transmitting a digital identification signal characterizing capabilities of said apparatus;

disconnecting a receiving line; and upon detecting that the facsimile telephone number of the sender of the incoming transmission is not registered in the register of the facsimile telephone numbers, stopping a facsimile reception.

2. The apparatus of claim 1, wherein said apparatus selectively receives facsimile image data by further steps of:

receiving a calling tone signal;

upon receiving the calling tone signal, transmitting a called station identification signal;

upon transmitting the called station identification signal, transmitting a non-standard facilities signal specifying user requirements, the called subscriber identification signal, and the digital identification signal;

upon transmitting the non-standard facilities signal, receiving a non-standard setup signal responding to the non-standard facilities signal, the transmitting subscriber identification signal, and a digital command signal responding to the digital identification signal;

upon receiving the non-standard setup signal and the digital command signal, receiving a training check signal verifying training, said training check signal indicating acceptability of a data rate of a channel;

upon receiving the training check signal, transmitting a confirmation to receive signal confirming that a pre-message procedure has been completed, said confirmation to receive signal confirming that message transmissions can commence; and upon transmitting the confirmation to receive signal, receiving said facsimile image data.

3. The apparatus of claim 2, wherein said apparatus selectively receives said facsimile image data by further steps of:

during the step of receiving said facsimile image data, receiving an end of page signal indicating an end of a complete page of facsimile information; and upon receiving the end of page signal, transmitting a message confirmation signal responding to the end of page signal, said message confirmation signal indicating a message has been received.

4. The apparatus of claim 3, wherein said apparatus selectively receives said facsimile image data by a further step of receiving a multipage signal after transmitting a message confirmation signal, said multipage signal indicating that more transmissions can follow.

5. A method for selectively receiving facsimile image data, comprising the steps of:

detecting a ringing signal;

upon detecting the ringing signal, detecting whether an incoming transmission exists;

upon detecting that an incoming transmission does not exist, awaiting the ringing signal;

upon detecting that the incoming transmission exists, receiving the incoming transmission;

during the step of receiving the incoming transmission, conducting a communication protocol exchange;

during the step of conducting the communication protocol exchange, receiving a facsimile telephone number of a sender of the incoming transmission;

detecting whether the facsimile telephone number of the sender of the incoming transmission is registered in a register of facsimile telephone numbers of a receiver, the facsimile telephone numbers registered in the register of the receiver corresponding to facsimile telephone numbers for which selective reception of said facsimile image data is enabled;

upon detecting that the facsimile telephone number of the sender of the incoming transmission is registered in the register of the facsimile telephone numbers of the receiver, receiving said facsimile image data;

upon detecting that the facsimile telephone number of the sender of the incoming transmission is not registered in the register of the facsimile telephone numbers of the receiver, disconnecting a receiving line; and upon detecting that the facsimile telephone number of the sender of the incoming transmission is not registered in the register of the facsimile telephone numbers of the receiver, stopping a facsimile reception.

6. The method of claim 5, further comprising the step of receiving said facsimile image data by proceeding with a normal protocol exchange.

7. A method for selectively receiving facsimile image data, comprising the steps of:

upon ringing of an incoming signal upon a facsimile machine of a receiver, proceeding with a protocol exchange between a facsimile machine of a sender and the facsimile machine of the receiver;

during said protocol exchange, detecting a transmitting subscriber identification signal;

using the transmitting subscriber identification signal detected during said protocol exchange, detecting whether a facsimile telephone number of the sender is registered in a register of the facsimile machine of the receiver, a facsimile telephone number registered in the register of the facsimile machine of the receiver corresponding to a facsimile telephone number for which selective reception of facsimile image data is enabled;

if the facsimile telephone number of the sender is registered in the register of the facsimile machine of the receiver, receiving said facsimile image data;

if the facsimile telephone number of the sender is not registered in the register of the facsimile machine of the receiver, transmitting a called subscriber identification signal and a digital identification signal;

disconnecting a receiving line;

receiving a disconnect signal from the facsimile machine of the sender, said disconnect signal indicating a request for a call end procedure; and stopping a facsimile reception.

8. The method of claim 7, wherein said step of disconnecting the receiving line occurs after the step of receiving the disconnect signal from the facsimile machine of the sender.

9. The method of claim 7, wherein said step of stopping the facsimile reception occurs after the step of disconnecting the receiving line.

10. A method for selectively receiving facsimile image data, comprising the steps of:

upon ringing of an incoming signal, determining whether a facsimile machine of a receiver is set for a selective reception from at least one facsimile telephone number of a corresponding sender registered in a register of the facsimile machine of the receiver;

if the facsimile machine of the receiver is set for the selective reception, receiving a facsimile telephone number of a sender by proceeding with a first protocol exchange;

if the facsimile telephone number of the sender is registered in the register of the facsimile machine of the receiver, receiving said facsimile image data; and if the facsimile telephone number of the sender is not registered in the register of the facsimile machine of the receiver, disconnecting a receiving line to stop a facsimile reception.

11. The method of claim 10, further including the step of receiving said facsimile image data by proceeding with a second protocol exchange if the facsimile telephone number of the sender is registered in the register of the facsimile machine of the receiver.

12. A method for selectively receiving facsimile image data, comprising the steps of:

upon ringing of an incoming signal, determining whether a facsimile machine of a receiver is set for a selective reception from at least one facsimile telephone number of a corresponding sender registered in a register of the facsimile machine of the receiver;

upon ringing of the incoming signal upon the facsimile machine of the receiver, proceeding with a protocol exchange between a facsimile machine of a sender and the facsimile machine of the receiver;

during said protocol exchange, detecting a transmitting subscriber identification signal;

when the facsimile machine of the receiver is set for the selective reception, using the transmitting subscriber identification signal detected during said protocol exchange, detecting whether a facsimile telephone number of the sender is registered in the register of the facsimile machine of the receiver;

when the facsimile telephone number of the sender is registered in the register of the facsimile machine of the receiver, receiving said facsimile image data;

when the facsimile telephone number of the sender is not registered in the register of the facsimile machine of the receiver, transmitting a called subscriber identification signal and a digital identification signal;

disconnecting a receiving line;

receiving a disconnect signal from the facsimile machine of the sender; and stopping a facsimile reception.

13. The method of claim 12, wherein said step of disconnecting the receiving line occurs after the step of receiving the disconnect signal from the facsimile machine of the sender.

14. The method of claim 12, wherein said step of stopping the facsimile reception occurs after the step of disconnecting the receiving line.

15. The method of claim 12, wherein during the step of transmitting the called subscriber identification signal and the digital identification signal, the called subscriber identification signal and the digital identification signal are transmitted to the facsimile machine of sender.

16. The method of claim 12, further comprising the step of receiving said facsimile image data by proceeding with a normal protocol exchange if the facsimile machine of the receiver is not set for the selective reception.

17. A facsimile telecommunication apparatus, comprising:

a network control unit connectable to a telephone line;

a modem permitting transmission and reception of information with said network control unit;

a central processing unit connected to said modem;

an operator panel permitting program inputs by a user, said operator panel connected to said central processing unit;

a scanner for converting an image into computer data, said scanner controlled by said central processing unit;

a memory for storing said computer data, said memory controlled by said central processing unit; and a printer controlled by said central processing unit;

said facsimile telecommunication apparatus for selectively receiving facsimile image data by:

said central processing unit detecting a ringing signal received through said network control unit;

said central processing unit conducting a communication protocol exchange; while conducting the communication protocol exchange, receiving a facsimile telephone number of a sender of incoming transmission for said facsimile image data; said central processing unit determining whether a transmitting subscriber identification signal has been detected, said transmitting subscriber identification signal indicating that a facsimile information field signal following the transmitting subscriber identification signal identifies the sender of the incoming transmission, said transmitting subscriber identification signal providing security to the incoming transmission by having a customized coding format;

detecting whether the facsimile telephone number of the sender of the incoming transmission is registered in a register of said memory of facsimile telephone numbers;

upon detecting that the facsimile telephone number of the sender of the incoming transmission is registered in the register of said memory of the facsimile telephone numbers, receiving said facsimile image data;

said scanner converting said facsimile image data into computer data;

said printer printing computer data corresponding to said facsimile image data;

upon detecting that the facsimile telephone number of the sender of the incoming transmission is not registered in the register of said memory of the facsimile telephone numbers, transmitting a called subscriber identification signal identifying said facsimile telecommunication apparatus by using an international telephone number of a station of said facsimile telecommunication apparatus, and transmitting a digital identification signal characterizing capabilities of said facsimile telecommunication apparatus; and stopping a facsimile reception.

* * * * *